UNITED STATES PATENT OFFICE.

CONSTANTIN FAHLBERG, OF SALBKE-WESTERHAUSEN, GERMANY.

PROCESS OF PURIFYING SACCHARIN.

SPECIFICATION forming part of Letters Patent No. 496,113, dated April 25, 1893.

Application filed March 23, 1892. Serial No. 426,152. (Specimens.)

*To all whom it may concern:*

Be it known that I, CONSTANTIN FAHLBERG, a citizen of the United States, residing at Salbke - Westerhausen, Kingdom of Prussia, Germany, have invented a new and useful Improvement in the Process of Producing Pure Saccharin, of which the following is a specification.

The crude saccharin produced according to the specification of my United States Patent, Reissue No. 10,667, dated December 1, 1885, consists in a mixture of anhydro-ortho-sulph-amin-benzoic acid, $C_7H_5NSO_3$, also called benzoic - acid - sulphinid, and para sulphamin-benzoic acid ($C_7H_7NSO_4$) in the nearly constant proportion of sixty per cent. of the former and forty per cent. of the latter. The sweetening power of this mixture is about three-hundred times as great as that of common sugar, while the pure anhydro-ortho sulph-amin-benzoic acid is yet about forty per cent. sweeter. The separation of the two acids from each other has, however, heretofore presented considerable difficulties, because the solubility of the acids themselves, as well as that of their salts, in water and other solvents is nearly the same. The only available method of separating the free acids has been by means of sulphuric ether, but this method is expensive and dangerous and also imperfect, inasmuch as the purified saccharin produced according to the same, still contains ten per cent. and more of the para-sulphamin-benzoic acid.

For the sake of brevity and simplicity of expression I shall, in the following part of this specification, call the anhydro - ortho-sulphamin-benzoic acid the "ortho-acid," and the para sulphamin-benzoic-acid the "para-acid."

This invention consists in a new method for separating out the para-acid from a mixture of the alkaline or alkaline earth salts of the said acids $C_7H_5NSO_3$ in a complete and convenient manner.

The method is based on the property inherent in the two acids and discovered by me that the ortho-acid has greater affinity to alkalies and alkaline earths than the para-acid. If therefore, to an aqueous solution of the mixture of the said salts, an acid is added which is stronger than the para-acid, and the quantity whereof is the chemical equivalent of the same, the acid that is added will attack the para-salt only, owing to the greater affinity of the ortho-acid to its base, and will combine with the basic component of the para-salt, so that the para-acid is precipitated, while the ortho-acid remains unchanged in solution. The acids to be employed may be mineral acids, for instance hydro chloric and sulphuric acids, or organic acids, such as oxalic, tartaric, citric and acetic acids, but also the ortho-acid itself is available, and even the mixture of ortho-acid and para-acid, or crude saccharin, may be used. In the latter case the whole quantity of para-acid contained in the dissolved mixture of the salts and in the saccharin added, is separated out.

The following is an example of the ways of carrying out the invention. I take a cold, concentrated, nearly-saturated and neutral aqueous solution of the alkaline salts of the ortho and para-acids, for instance such as is obtained according to the specification of the aforesaid United States patent by neutralizing and evaporating down the lyes of oxidation of toluol-sulphamid. To this solution I add a mineral acid in about such quantity as is requisite to separate out the para-acid only. If, hydrochloric acid (HCl) is employed, a suitable proportion thereof to the para-acid ($C_7H_7O_4SN$) is forty parts by weight of the former to two hundred parts of the latter. The liquid is heated to about 100° centigrade in order to promote the decomposition. When it becomes cold again nearly the whole amount of para-acid precipitates, while in the solution there remains the almost pure salt of ortho-acid together with the alkaline salt of the acid added. This solution is then filtered off from the para-acid.

The process is the same if ortho-acid is used instead of the said mineral acid, but the liquor remaining after the precipitation of the para-acid contains the alkaline salt of the ortho-acid only. If the mixture of ortho and para-acids, or crude saccharin, is employed, the operative agent will again be the ortho-acid, while the para-acid added precipitates out together with the quantity of para-acid obtained by decomposition from the para-salt.

For producing the ortho-acid from the solution filtered off from the para-acid, the filtrate is subjected to the action of a suitable acid (preferably a mineral acid) stronger than the ortho-acid, with the effect of precipitating the said ortho-acid, which is finally washed, and, if desired, recrystallized, in order to be converted into pure commercial saccharin.

I claim as my invention—

The process of producing anhydro-ortho-sulphamin-benzoic acid from a solution of a mixture of the alkaline or alkaline earth salts of anhydro-ortho sulphamin-benzoic and para-sulphamin-benzoic acids, which consists in adding to the said solution an acid such as specified which is stronger than the para-sulphamin-benzoic acid and the quantity whereof is such as to separate only the para-sulphamin-benzoic acid from its base and to precipitate the same, filtering off the liquid which contains the salt of anhydro-ortho sulphamin-benzoic acid, and adding to the filtrate an acid stronger than the said anhydro-ortho sulphamin-benzoic acid, whereby the latter, or pure saccharin is precipitated, substantially as described.

In testimony whereof I have hereunto set my hand in the presence of two subscribing witnesses.

CONSTANTIN FAHLBERG.

Witnesses:
GUSTAV WEREMEYER,
W. EGGELING.